(12) United States Patent
Liu et al.

(10) Patent No.: US 6,576,045 B2
(45) Date of Patent: Jun. 10, 2003

(54) MULTI-STAGE DIESEL PARTICULATE COLLECTOR SYSTEM WITH COMBINED PROCESSES OF INERTIAL IMPACTION, VIRTUAL IMPACTION, AND FILTRATION

(75) Inventors: Z. Gerald Liu, Madison, WI (US); C. Raymond Cheng, Madison, WI (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/950,143

(22) Filed: Sep. 10, 2001

(65) Prior Publication Data

US 2003/0047074 A1 Mar. 13, 2003

(51) Int. Cl.[7] ............................................. B01D 45/08
(52) U.S. Cl. ........................ 95/268; 55/323; 55/325; 55/446; 55/DIG. 30
(58) Field of Search .................... 95/268; 55/321, 55/322, 323, 325, 446, 418, DIG. 30; 60/311

(56) References Cited

U.S. PATENT DOCUMENTS

| | | |
|---|---|---|
| 1,040,914 A | 10/1912 | Farmer |
| 3,559,760 A * | 2/1971 | Ninomiya .................. 181/231 |
| 3,693,457 A | 9/1972 | Pilat |
| 4,297,116 A | 10/1981 | Cusick |
| 4,387,603 A | 6/1983 | Nelson |
| 4,565,554 A | 1/1986 | Zipay et al. |
| 4,640,140 A | 2/1987 | Burghoffer et al. |
| 4,744,958 A | 5/1988 | Pircon |
| 4,823,549 A | 4/1989 | Moser |
| 5,284,498 A | 2/1994 | Davis et al. |
| 5,470,364 A | 11/1995 | Adiletta |
| 5,611,198 A | 3/1997 | Lane et al. |

* cited by examiner

*Primary Examiner*—Robert A. Hopkins
(74) *Attorney, Agent, or Firm*—Andrus, Sceales, Starke & Sawall, LLP

(57) ABSTRACT

A diesel particulate collector (10) based on the principles of inertial impaction, virtual impaction, and filtration, for controlling exhaust emissions (12) from a diesel internal combustion engine (14) includes a housing (16) having a first plate (24) with a plurality of nozzles (26) directing exhaust flow therethrough, a first impactor (28) causing particle separation and a change of flow direction, a second plate (30) having a second set of nozzles (32) directing exhaust flow therethrough, and a second impactor (34) causing particle separation and a change of flow direction, in a first of multiple stages in a sequential cascaded separation and collection system.

27 Claims, 4 Drawing Sheets

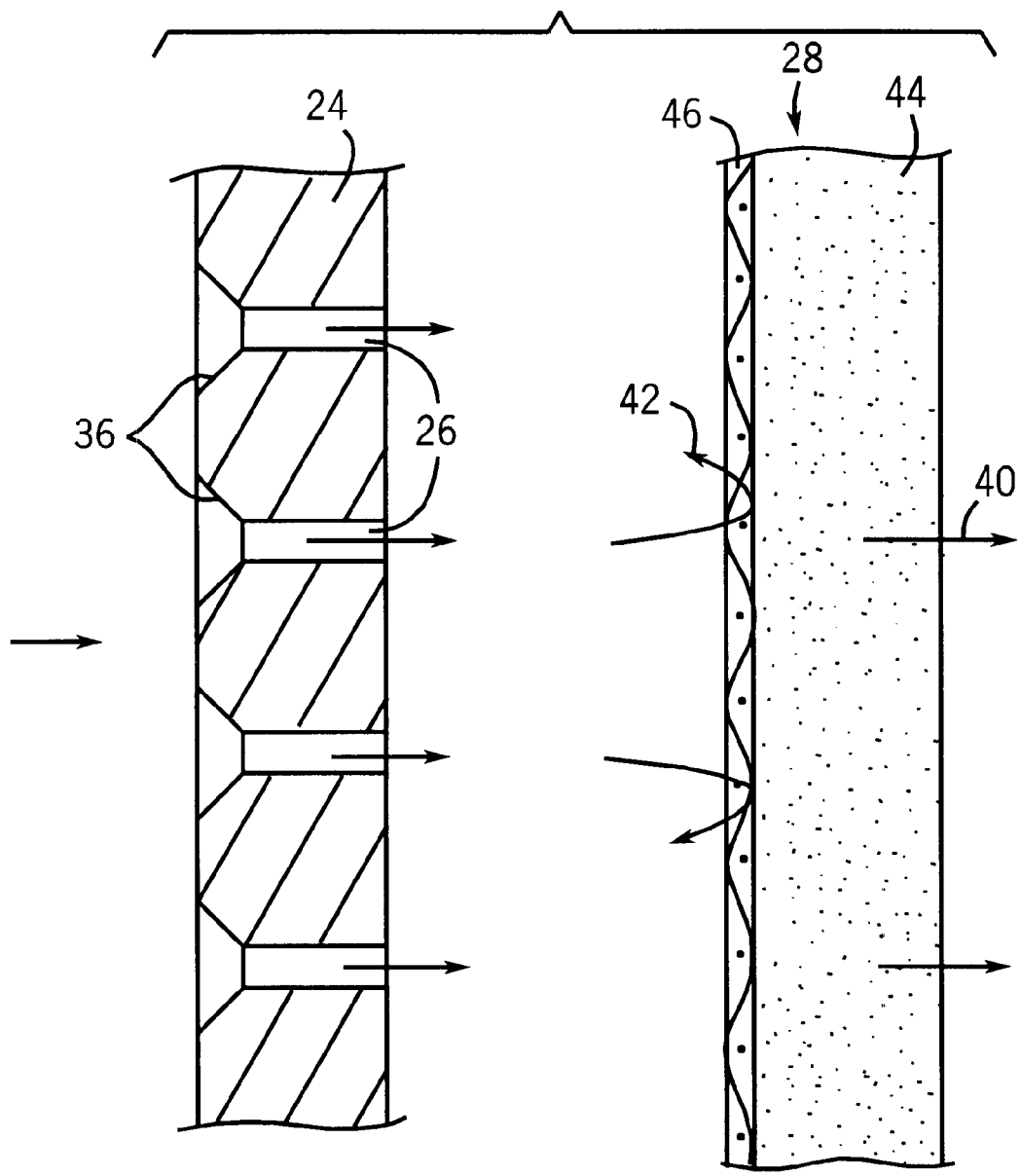

MULTI-STAGE DIESEL PARTICULATE COLLECTOR SYSTEM WITH COMBINED PROCESSES OF INERTIAL IMPACTION, VIRTUAL IMPACTION, AND FILTRATION

BACKGROUND AND SUMMARY

The invention relates to diesel particulate collectors for controlling exhaust emissions from a diesel internal combustion engine.

In the control of diesel particulate emissions, wall flow filters have been widely used. The restriction of the filter increases with time due to the increasing amount of soot deposited in the filter. The limited soot loading capacity requires the filter to be regenerated through either passive or active processes. During each cycle of regeneration, however, a filter can never be recovered to its initial restriction level due to ash accumulation. A filter has to be discarded if it cannot be regenerated to meet back pressure requirements specified by the diesel engine manufacturer. A system with high soot loading capacity is thus desired, for less frequent regeneration, longer operating time, and longer service intervals.

The present invention provides a multi-stage diesel particulate collector combining in preferred form various principles including inertial impaction, virtual impaction, and filtration. A series of inertial impactors form a cascade to trap diesel soot particles. The inertial impactor accelerates the particle laden exhaust gas flow through an array of orifices or nozzles, and then forces the flow to change direction, causing the larger particles to impact on a collector. Low pressure behind the porous impactor generates secondary flow causing smaller soot particles to be virtually impacted and then captured through a filtration process. As the flow moves through further stages, even smaller particles are carried with the exhaust gas flow stream and are removed at following stages of collectors.

BRIEF DESCRIPTION OF THE DRAWINGS

FIG. 3 is an enlarged sectional view taken along line 3—3 of FIG. 2 and showing an enlarged portion of FIG. 1.

DETAILED DESCRIPTION

Figure 1:
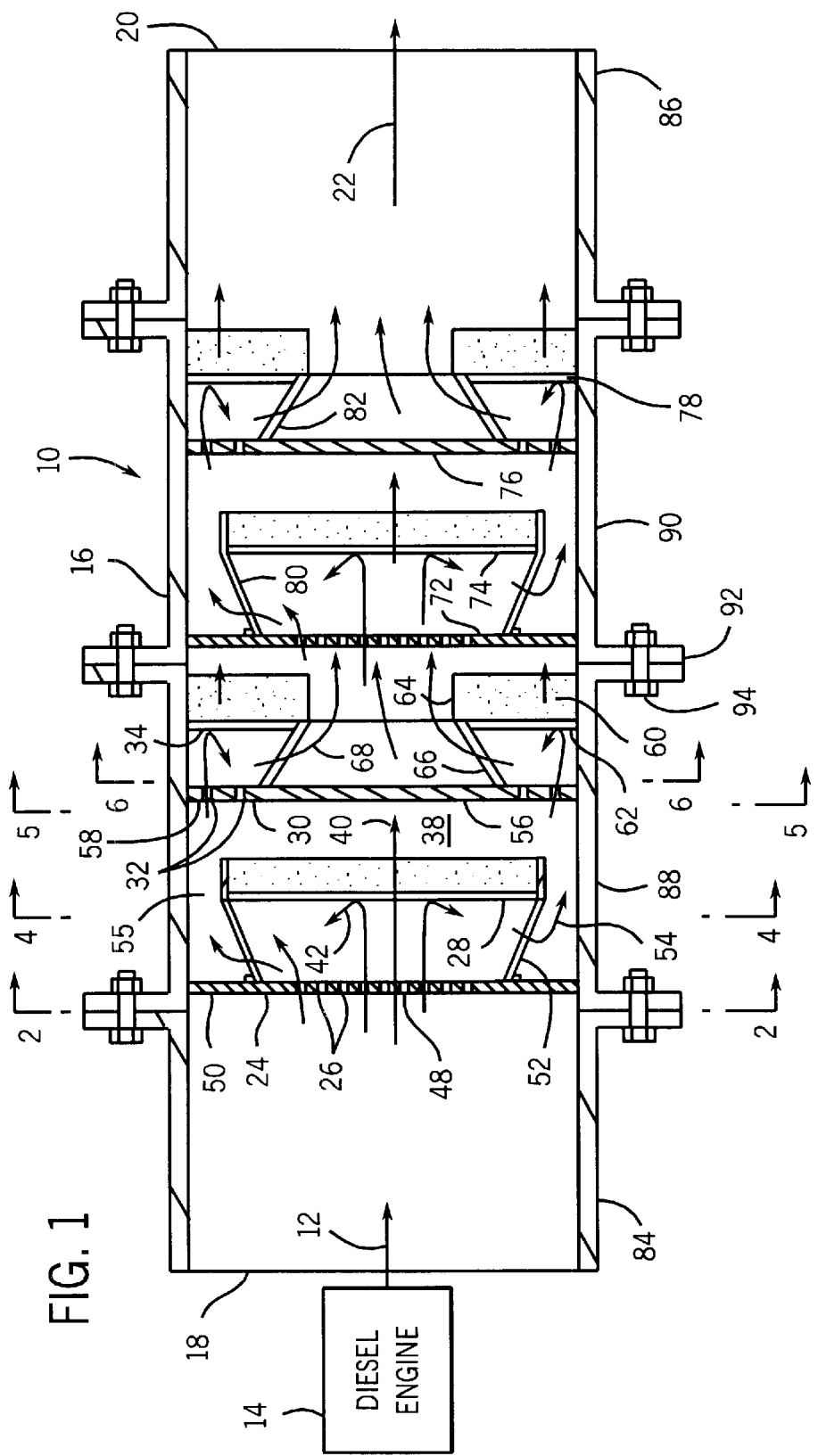
FIG. 1 is a schematic side sectional view of diesel particulate collector in accordance with the invention.
Figure 2:
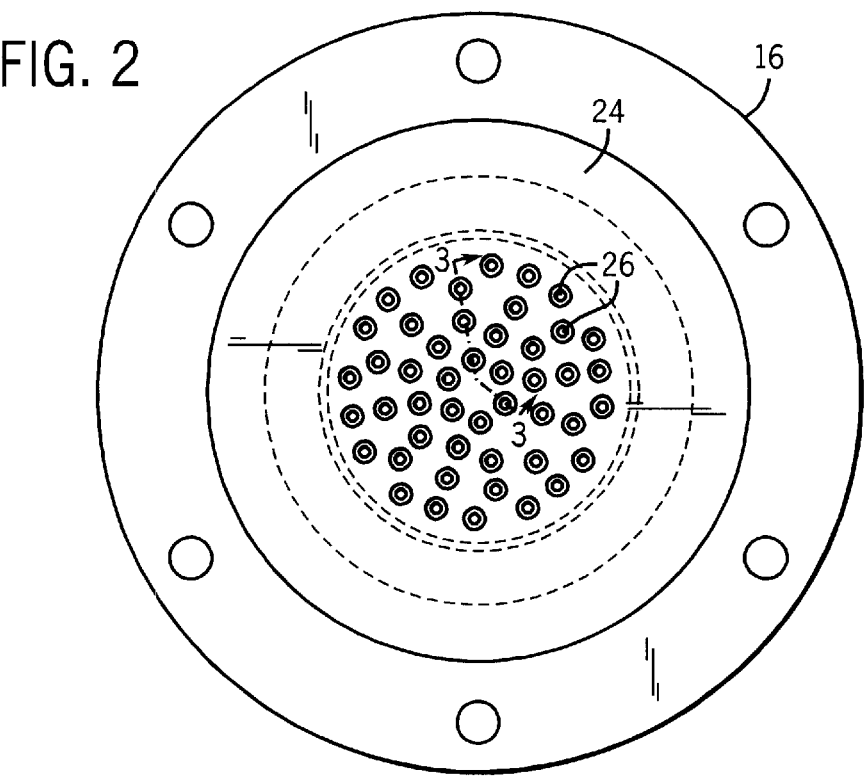
FIG. 2 is a sectional view taken along line 2—2 of FIG. 1.
Figure 4:
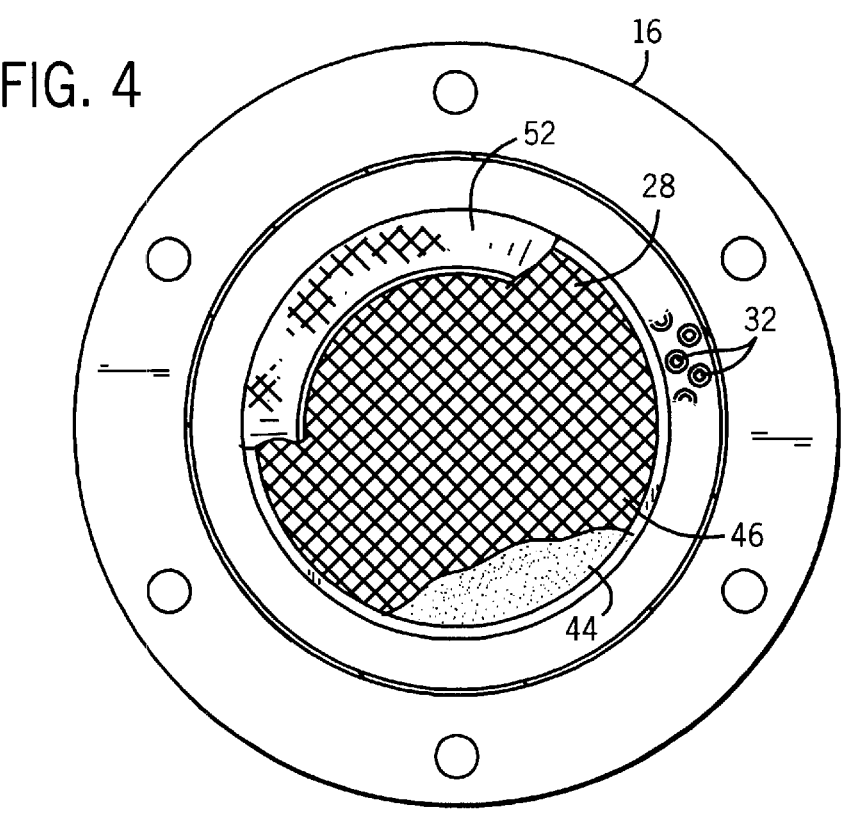
FIG. 4 is a sectional view taken along line 4—4 of FIG. 1.
Figure 5:
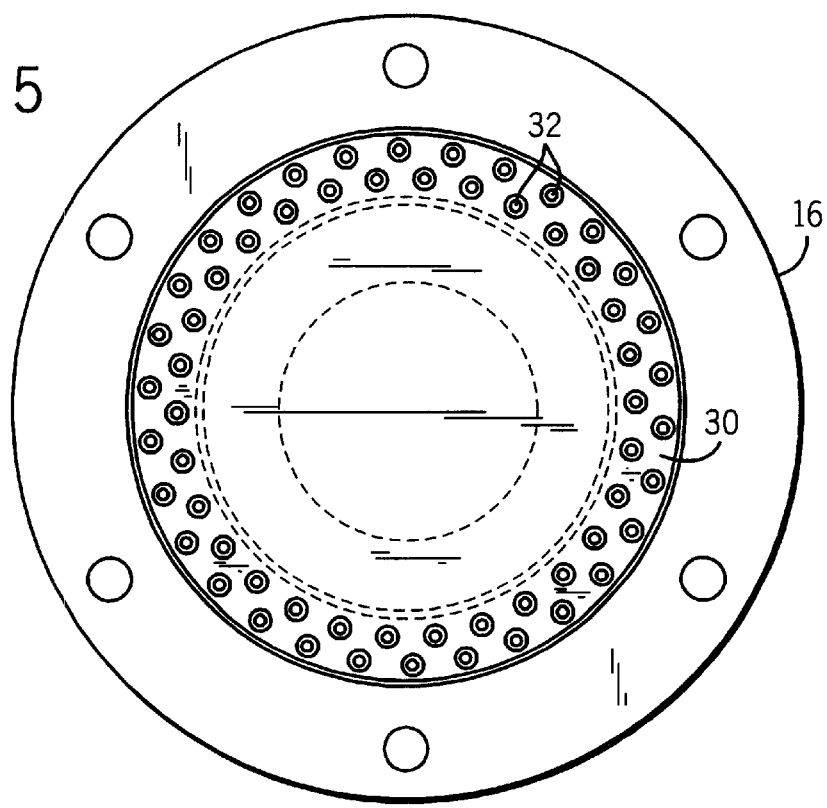
FIG. 5 is a sectional view taken along line 5—5 of FIG. 1.
Figure 6:
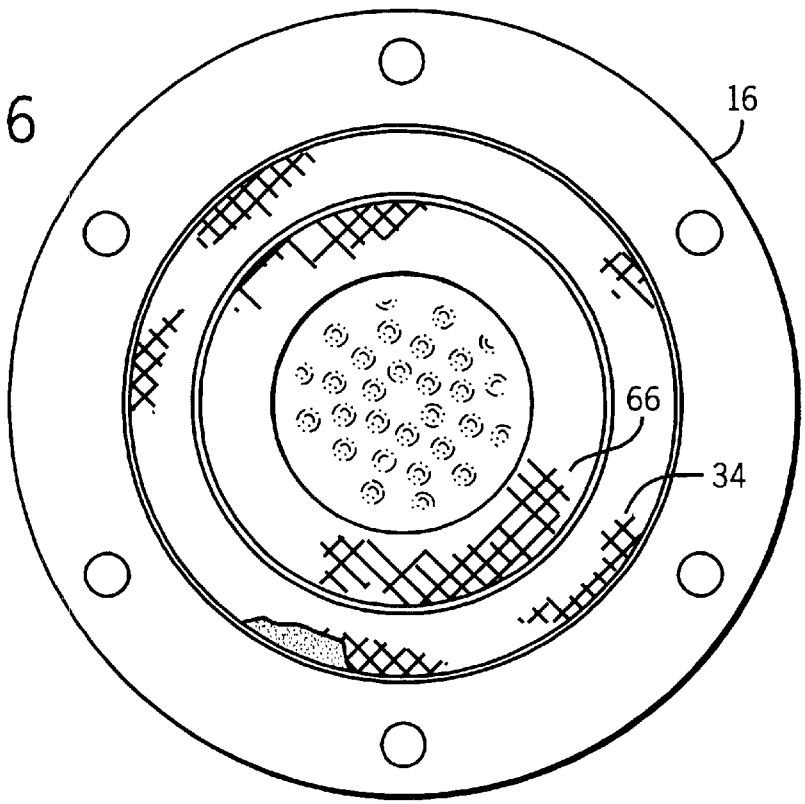
FIG. 6 is a sectional view taken along line 6—6 of FIG. 1.

FIG. 1 shows a diesel particulate collector 10 for controlling exhaust emissions 12 from a diesel internal combustion engine 14. A housing 16 has an upstream inlet 18 for receiving exhaust from the diesel engine, and a downstream outlet 20 for discharging the exhaust. The housing conducts exhaust axially therethrough as shown at 22. A first plate 24 receives exhaust flow from inlet 18 and has a first set of nozzles 26, FIGS. 1–3, directing exhaust flow therethrough. A first inertial impactor 28 is provided in the housing downstream of plate 24 and in the path of exhaust flow from nozzles 26 and causes particle separation and a change of flow direction. A second plate 30 is provided in the housing downstream of impactor 28 and receives exhaust flow therefrom and has a second set of nozzles 32, FIGS. 1,5, directing exhaust flow therethrough. A second inertial impactor 34 is provided in the housing downstream of plate 30 and in the path of exhaust flow from nozzles 32 and causes particle separation and a change of flow direction.

Plate 24 is a metal plate with holes drilled therethrough with tapered upstream ends 36, FIG. 3, to provide jet nozzles accelerating exhaust flow against impactor 28 and creating a low pressure zone 38 downstream of impactor 28. Impactor 28 is a porous impactor passing some of the exhaust flow therethrough as shown at arrow 40, and reflecting some of the exhaust flow and causing a change of direction as shown at arrow 42. The porous impactor is provided by porous media 44, FIG. 3, for example high temperature non-metallic or metallic porous material such as ceramic fibers or sintered metal, having an upstream face at a metal screen or mesh 46. The upstream face is a collector for particles separated from the exhaust flow upon the noted change of direction. Low pressure zone 38 creates secondary flow through the porous impactor causing virtual impaction of particles smaller than the noted particles separated upon the change of direction, which smaller particles are captured by filtration in porous media 44.

Plate 24 has a central section 48 surrounded by an outer section 50. Central section 48 has the noted nozzles 26 therethrough. Outer section 50 blocks exhaust flow. Central section 48 and outer section 50 have the same area, i.e. the circular area of section 48 is the same as the annular area of section 50. A frusto-conical shroud 52 extends axially between plate 24 and impactor 28. The shroud has an upstream end at outer section 50 of plate 24, and tapers outwardly to a wider downstream end at impactor 28. Shroud 52 is perforated and passes exhaust flow therethrough as shown at arrows 54, including exhaust flow reflected from porous impactor 28. Porous impactor 28 is axially aligned with the set of nozzles 26 and has an upstream face having an area larger than the area of central section 48 of plate 24. Narrow passage 55 enhances acceleration of the exhaust flow, further reducing the pressure at low pressure zone 38 behind impactor 28.

Plate 30 has a central section 56 blocking exhaust flow and surrounded by an outer section 58 having the set of nozzles 32 therethrough, which nozzles are formed by drilling a set of holes through the plate, comparably to the drilling of nozzle holes 26. Outer section 58 and central section 56 have the same area, i.e. the annular area of section 58 is the same as the circular area of section 56. Impactor 34 is comparable to impactor 28 including porous media 60 comparable to media 44, and metal screen 62 comparable to screen 46; however impactor 34 defines an annulus with a hollow interior 64. The area of hollow interior 64 of impactor 34 is smaller than the area of central section 56 of plate 30. A frusto-conical shroud 66 extends axially between plate 30 and impactor 34, and has an upstream end at central section 56 of plate 30, and tapers inwardly to a narrower downstream end at impactor 34. Shroud 66 is perforated and passes exhaust flow therethrough as shown at arrows 68, including exhaust flow reflected from porous impactor 34.

Central section 48 of first plate 24, first impactor 28, and central section 56 of second plate 30 are axially aligned, with first impactor 28 being axially between central section 48 of first plate 24 and central section 56 of second plate 30. Outer section 50 of first plate 24, outer section 58 of second plate 30, and second impactor 34 are axially aligned, with outer section 58 of second plate 30 being axially between outer section 50 of first plate 24 and second impactor 34.

Third plate 72, third impactor 74, fourth plate 76, fourth impactor 78, third frusto-conical shroud 80, and fourth frusto-conical shroud 82 are identical respectively to first plate 24, first impactor 28, second plate 30, second impactor 34, first frusto-conical shroud 52, and second frusto-conical shroud 66, except for decreasing nozzle size and porosity to increase the jet momentum for capturing smaller particles as the exhaust flow continues downstream. A modular multi-stage serially axially cascaded structure is provided. The housing includes an inlet section 84 having inlet 18, an outlet section 86 having outlet 20, and a plurality of intermediate sections such as 88 and 90 having respective mating flanges such as 92 secured to each other by bolts such as 94. Housing section 88 houses a first stage provided by plates 24 and 30 and impactors 28 and 34. Housing section 90 provides a second sequential stage provided by plates 72 and 76 and impactors 74 and 78. Further stages may be added as desired. Pressure transducers (not shown) can be placed at various upstream, downstream and intermediate locations along the housing to monitor restriction. When one or more collectors reach maximum capacity, the soot filled porous media can be replaced and/or its respective stage can be replaced and/or the device can be cleaned. The multi-stage collector is particularly well suited as a pre-collector with other primary diesel particulate filters in order to increase the system soot loading capacity, resulting in less frequently required regeneration.

It is recognized that various equivalents, alternatives and modifications are possible within the scope of the appended claims.

What is claimed is:

1. A diesel particulate collector for controlling exhaust emissions from a diesel internal combustion engine, comprising:

a housing having an upstream inlet for receiving exhaust from said diesel engine, and a downstream outlet for discharging said exhaust, said housing conducting said exhaust axially therethrough;

a first plate in said housing receiving exhaust flow from said inlet and having a first set of nozzles directing said exhaust flow therethrough;

a first impactor in said housing downstream of said first plate and in the path of exhaust flow from said first set of nozzles and causing particle separation and a change of flow direction;

a second plate in said housing downstream of said first impactor and receiving exhaust flow therefrom and having a second set of nozzles directing said exhaust flow therethrough;

second impactor in said housing downstream of said second plate and in the path of exhaust flow from said second set of nozzles and causing particle separation and a change of flow direction, wherein said first set of nozzles are jet nozzles accelerating exhaust flow against said first impactor and creating a low pressure zone downstream of said first impactor, and wherein said first impactor comprises a porous impactor passing some of said exhaust flow therethrough and reflecting some of said exhaust flow and causing said change of flow direction.

2. The diesel particulate collector according to claim 1 wherein said porous impactor comprises porous media having an upstream face providing a collector for particles separated from said exhaust flow upon said change of direction, and wherein said low pressure zone creates secondary flow through said porous impactor causing virtual impaction of particles smaller than said particles separated from said exhaust flow upon said change of direction, followed by capture of said smaller particles by filtration in said porous media.

3. A diesel particulate collector for controlling exhaust emissions from a diesel internal combustion engine, comprising:

a housing having an upstream inlet for receiving exhaust from said diesel engine, and a downstream outlet for discharging said exhaust, said housing conducting said exhaust axially therethrough;

a first plate in said housing receiving exhaust flow from said inlet and having a first set of nozzles directing said exhaust flow therethrough;

a first impactor in said housing downstream of said first plate and in the path of exhaust flow from said first set of nozzles and causing particle separation and a change of flow direction;

a second plate in said housing downstream of said first impactor and receiving exhaust flow therefrom and having a second set of nozzles directing said exhaust flow therethrough;

a second impactor in said housing downstream of said second plate and in the path of exhaust flow from said second set of nozzles and causing particle separation and a change of flow direction;

a shroud extending between one of said plates and one of said impactors, said one impactor comprising a porous impactor passing some of said exhaust flow therethrough and reflecting some of said exhaust flow to cause a change of direction, said shroud being perforated and passing exhaust flow therethrough, including exhaust flow reflected from said porous impactor, said shroud creating a narrow passage between said shroud and said housing increasing acceleration of exhaust flow and reducing pressure downstream of said one impactor.

4. A diesel particulate collector for controlling exhaust emissions from a diesel internal combustion engine, comprising:

a housing having an upstream inlet for receiving exhaust from said diesel engine, and a downstream outlet for discharging said exhaust, said housing conducting said exhaust axially therethrough;

a first plate in said housing receiving exhaust flow from said inlet and having a first set of nozzles directing said exhaust flow therethrough;

a first impactor in said housing downstream of said first plate and in the path of exhaust flow from said first set of nozzles and causing particle separation and a change of flow direction;

a second plate in said housing downstream of said first impactor and receiving exhaust flow therefrom and having a second set of nozzles directing said exhaust flow therethrough;

a second impactor in said housing downstream of said second plate and in the path of exhaust flow from said second set of nozzles and causing particle separation and a change of flow direction, wherein one of said plates has a central section surrounded by an outer section, one of said sections having one of said sets of nozzles therethrough, the other of said sections blocking exhaust flow, and comprising a frusto-conical shroud extending axially between said one plate and one of said impactors, said shroud tapering from an upstream end at said other section of said one plate to a downstream end at said one impactor, wherein said one impactor comprises a porous impactor passing some of said exhaust flow therethrough and reflecting some of said exhaust flow to cause a change of direction, wherein said shroud is perforated and passes exhaust flow therethrough, including exhaust flow reflected from said porous impactor.

5. The diesel particulate collector according to claim 4 wherein said downstream end of said frusto-conical shroud is wider than said upstream end of said frusto-conical shroud.

6. A diesel particulate collector for controlling exhaust emissions from a diesel internal combustion engine, comprising:
   a housing having an upstream inlet for receiving exhaust from said diesel engine, and a downstream outlet for discharging said exhaust, said housing conducting said exhaust axially therethrough;
   a first plate in said housing receiving exhaust flow from said inlet and having a first set of nozzles directing said exhaust flow therethrough;
   a first impactor in said housing downstream of said first plate and in the path of exhaust flow from said first set of nozzles and causing particle separation and a change of flow direction;
   a second plate in said housing downstream of said first impactor and receiving exhaust flow therefrom and having a second set of nozzles directing said exhaust flow therethrough;
   a second impactor in said housing downstream of said second plate and in the path of exhaust flow from said second set of nozzles and causing particle separation and a change of flow direction,
   wherein one of said plates has a central section surrounded by an outer section, said central section having one of said sets of nozzles therethrough, said outer section blocking exhaust flow, and wherein one of said impactors comprises a porous impactor passing some of said exhaust flow therethrough and reflecting some of said exhaust flow and causing a change of direction, said porous impactor being axially aligned with said one set of nozzles, said porous impactor having an upstream face having an, area larger than the area of said central section of said one plate.

7. The diesel particulate collector according to claim 6 comprising a frusto-conical shroud extending axially between said one plate and said one impactor, said shroud having an upstream end at said outer section of said one plate, and tapering to a wider downstream end at said one impactor, said shroud being perforated and passing exhaust flow therethrough, including exhaust flow reflected from said porous impactor.

8. A diesel particulate collector for controlling exhaust emissions from a diesel internal combustion engine, comprising:
   a housing having an upstream inlet for receiving exhaust from said diesel engine, and a downstream outlet for discharging said exhaust, said housing conducting said exhaust axially therethrough;
   a first plate in said housing receiving exhaust flow from said inlet and having a first set of nozzles directing said exhaust flow therethrough;
   a first impactor in said housing downstream of said first plate and in the path of exhaust flow from said first set of nozzles and causing particle separation and a change of flow direction;
   a second plate in said housing downstream of said first impactor and receiving exhaust flow therefrom and having a second set of nozzles directing said exhaust flow therethrough;
   a second impactor in said housing downstream of said second plate and in the path of exhaust flow from said second set of nozzles and causing particle separation and a change of flow direction,
   wherein one of said plates has a central section surrounded by an outer section, said outer section having one of said sets of nozzles therethrough, said central section blocking exhaust flow, and wherein one of said impactors comprises a porous impactor passing some of said exhaust flow therethrough and reflecting some of said exhaust flow and causing a change of direction, said porous impactor being axially aligned with said one set of nozzles, said porous impactor having an upstream face defining an annulus with a hollow interior, said hollow interior having an area smaller than the area of said central section of said one plate.

9. The diesel particulate collector according to claim 8 comprising a frusto-conical shroud extending axially between said one plate and said one impactor, said shroud having an upstream end at said central section of said one plate, and tapering to a narrower downstream end at said one impactor, said shroud being perforated and passing exhaust flow therethrough, including exhaust flow reflected from said porous impactor.

10. A diesel particulate collector for controlling exhaust emissions from a diesel internal combustion engine, comprising:
   a housing having an upstream inlet for receiving exhaust from said diesel engine, and a downstream outlet for discharging said exhaust, said housing conducting said exhaust axially therethrough;
   a first plate in Said housing receiving exhaust flow from said inlet and having a first set of nozzles directing said exhaust flow therethrough;
   a first impactor in said housing downstream of said first plate and in the path of exhaust flow from said first set of nozzles and causing particle separation and a change of flow direction;
   a second plate in said housing downstream of said first impactor and receiving exhaust flow therefrom and having a second set of nozzles directing said exhaust flow therethrough;
   a second impactor in said housing downstream of said second plate and in the path of exhaust flow from said second set of nozzles and causing particle separation and a change of flow direction,
   wherein:
      one of said plates has a central section surrounded by an outer section, said central section having one of said sets of nozzles therethrough, said outer section blocking exhaust flow;
      one of said impactors comprises a porous impactor passing some of said exhaust flow therethrough and reflecting some of said exhaust flow and causing a change of direction, said porous impactor being axially aligned with said one set of nozzles;
      the other of said plates has a central section surrounded by an outer section, said outer section of said other plate having the other of said sets of nozzles therethrough, said central section of said other plate blocking exhaust flow;

the other of said impactors comprises a porous impactor passing some of said exhaust flow therethrough and reflecting some of said exhaust flow and causing a change of direction, said porous impactor of said other impactor being axially aligned with said other set of nozzles;

said central section of said one plate, said first impactor, and said central section of said other plate are axially aligned, with said one impactor being axially between said central section of said one plate and said central section of said other plate;

said outer section of said one plate, said outer section of said other plate, and said other impactor are axially aligned, with said outer section of said other plate being axially between said outer section of said one plate and said other impactor.

11. The diesel particulate collector according to claim 10 comprising:

a first frusto-conical shroud extending axially between said one plate and said one impactor, said first frusto-conical shroud having an upstream end at said outer section of said one plate, and tapering to a wider downstream end at said one impactor, said first frusto-conical shroud being perforated and passing exhaust flow therethrough, including exhaust flow reflected from said one impactor;

a second frusto-conical shroud extending axially between said other plate and said other impactor, said second frusto-conical shroud having an upstream end at said central section of said other plate, and tapering to a narrower downstream end at said other impactor, said second frusto-conical shroud being perforated and passing exhaust flow therethrough, including exhaust flow reflected from said second impactor.

12. A diesel particulate collector for controlling exhaust emissions from a diesel internal combustion engine, comprising:

a housing having an upstream inlet for receiving exhaust from said diesel engine, and a downstream outlet for discharging said exhaust, said housing conducting said exhaust axially therethrough;

a first plate in said housing receiving exhaust flow from said inlet and having a first set of nozzles directing exhaust flow therethrough;

a first impactor in said housing downstream of said first plate and in the path of exhaust flow from said first set of nozzles and causing particle separation and a change of flow direction, said first impactor comprising a porous impactor passing some of said exhaust flow therethrough and reflecting some of said exhaust flow and causing said change of flow direction;

a second plate in said housing downstream of said first impactor and receiving exhaust flow therefrom, including exhaust passing through said first impactor and exhaust reflected from said first impactor, said second plate having a second set of nozzles directing exhaust flow therethrough;

a second impactor in said housing downstream of said second plate and in the path of exhaust flow from said second set of nozzles and causing particle separation and a change of flow direction, said second impactor comprising a porous impactor passing some of said exhaust flow therethrough and reflecting some of said exhaust flow and causing said change of flow direction;

a third plate in said housing downstream of said second impactor and receiving exhaust flow therefrom, including exhaust flowing through said second impactor and exhaust reflected from said second impactor, said third plate having a third set of nozzles directing exhaust flow therethrough;

a third impactor in said housing downstream of said third plate and in the path of exhaust flow from said third set of nozzles and causing particle separation and a change of flow direction, said third impactor comprising a porous impactor passing some of said exhaust flow therethrough and reflecting some of said exhaust flow and causing said change of flow direction;

a fourth plate in said housing downstream of said third impactor and receiving exhaust flow therefrom, including exhaust flowing through said third impactor and exhaust reflected from said third impactor, said fourth plate having a fourth set of nozzles directing exhaust flow therethrough;

a fourth impactor in said housing downstream of said fourth plate and in the path of exhaust flow from said fourth set of nozzles, said fourth impactor comprising a porous impactor passing some of said exhaust flow therethrough and reflecting some of said exhaust flow and causing said change of flow direction.

13. The diesel particulate collector according to claim 12 wherein said first and second plates and said first and second impactors are a first modular stage of a multi-stage cascaded collector, and said third and fourth plates and said third and fourth impactors are a second modular stage.

14. The diesel particulate collector according to claim 12 wherein said housing comprises at least an inlet section having said inlet, an outlet section having said outlet, and a plurality of intermediate cascaded sections serially axially aligned, including one section having a first modular stage, and another section having a final modular stage, and n modular stages between said first modular stage and said final modular stage, wherein n is greater than or equal to one.

15. The diesel particulate collector according to claim 13 wherein said first and second stages are identical except for size of said nozzles and porosity of said impactors.

16. The diesel particulate collector according to claim 13 wherein said first and third plates are identical, said second and fourth plates are identical, said first and third impactors are identical, and said second and fourth impactors are identical, except for size of said nozzles and porosity of said impactors.

17. The diesel particulate collector according to claim 12 wherein two of said plates have a central section with nozzles therethrough and surrounded by an outer blocking section, and the other two of said plates have a central blocking section surrounded by an outer section having nozzles therethrough, said central nozzle sections and central blocking sections being axially aligned, said outer blocking sections and outer nozzle sections being axially aligned, and wherein two of said impactors are axially aligned with said central sections, and the other two of said impactors are axially aligned with said outer sections.

18. The diesel particulate collector according to claim 17 wherein said other two impactors are annuli having hollow interiors axially aligned with said central sections.

19. A method for controlling exhaust emissions from a diesel internal combustion engine through a diesel particulate collector, comprising directing exhaust flow from said engine through a first set of nozzles in a first plate, impacting said exhaust flow from said first set of nozzles and causing particle separation and a change of flow direction, directing exhaust from said impactor through a second set of nozzles in a second plate, impacting exhaust flow from said second set of nozzles against a second impactor and causing particle separation and a change of flow direction, providing said first impactor as a porous impactor, accelerating exhaust flow through said first set of nozzles and creating a low pressure zone downstream of said first impactor, and passing some of said exhaust flow through said first impactor and reflecting some of said exhaust flow from said first impactor and causing a change of flow direction.

20. The method according to claim 19 comprising providing said porous impactor as porous media having an upstream face, collecting particles separated from said exhaust at said upstream face upon said change of direction, creating secondary flow through said porous impactor by said low pressure zone causing virtual impaction of particles smaller than said particles separated from said exhaust at said upstream face upon said change of direction, and then capturing said smaller particles by filtration in said porous media.

21. The method according to claim 20 comprising creating a further acceleration zone around said porous impactor increasing acceleration of said exhaust flow and further reducing pressure in said low pressure zone.

22. The method according to claim 21 comprising creating said further acceleration zone by a narrow passage provided by a shroud extending between said first plate and said first impactor, said narrow passage being between said shroud and said housing, and providing said shroud as a perforated member passing exhaust flow reflected from said upstream face of said porous impactor.

23. A method for controlling exhaust emissions from a diesel internal combustion engine through a diesel particulate collector, comprising directing exhaust flow from said engine through a first set of nozzles in a first plate, impacting said exhaust flow from said first set of nozzles and causing particle separation and a change of flow direction, directing exhaust from said impactor through a second set of nozzles in a second plate, impacting exhaust flow from said second set of nozzles against a second impactor and causing particle separation and a change of flow direction, providing one of said plates with a central section surrounded by an outer section, passing exhaust flow through one of said sets of nozzles in said central section, blocking exhaust flow at said outer section, providing one of said impactors as a porous impactor, passing some of said exhaust flow through said porous impactor and reflecting some of said exhaust flow from said porous impactor and causing a change of direction, axially aligning said porous impactor with said one set of nozzles.

24. The method according to claim 23 comprising providing said porous impactor with an upstream face facing said one set of nozzles and having an area larger than the area of said central section of said one plate.

25. A method for controlling exhaust emissions from a diesel internal combustion engine through a diesel particulate collector, comprising directing exhaust flow from said engine through a first set of nozzles in a first plate, impacting said exhaust flow from said first set of nozzles and causing particle separation and a change of flow direction, directing exhaust from said impactor through a second set of nozzles in a second plate, impacting exhaust flow from said second set of nozzles against a second impactor and causing particle separation and a change of flow direction, providing one of said plates with a central section surrounded by an outer section, passing exhaust flow through one of said sets of nozzles in said outer section, blocking exhaust flow at said central section, providing one of said impactors as a porous impactor, passing some of said exhaust flow through said porous impactor and reflecting some of said exhaust flow from said porous impactor and causing a change of direction, axially aligning said porous impactor with said one set of nozzles.

26. The method according to claim 25 comprising providing said porous impactor with an upstream face defining an annulus with a hollow interior, and axially aligning said hollow interior with said central section of said one plate.

27. The method according to claim 26 comprising providing said hollow interior with an area smaller than the area of said central section of said one plate.

* * * * *